Figure 1:
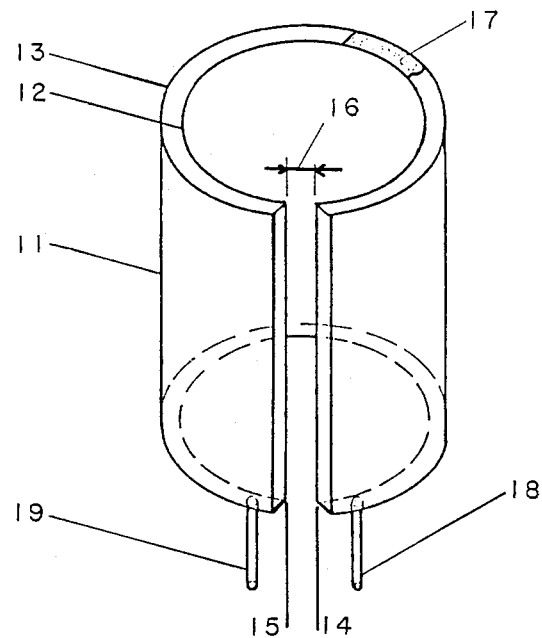

United States Patent [19]

Maier

[11] Patent Number: 4,821,529
[45] Date of Patent: Apr. 18, 1989

[54] REFRIGERATION SYSTEM FOR MOTOR CARS

[75] Inventor: Eliaho Maier, Patah-Tiqua, Israel

[73] Assignee: Loran & Co., Mobile Post Galil Elyon, Israel

[21] Appl. No.: 125,386

[22] Filed: Nov. 25, 1987

[30] Foreign Application Priority Data

Nov. 28, 1986 [IL] Israel .......................... 80805

[51] Int. Cl.⁴ .............................................. B60H 1/32
[52] U.S. Cl. ........................................ 62/239; 62/244; 62/337
[58] Field of Search ................. 62/244, 239, 243, 438, 62/452, 453, 458, 439, 518, 244 X, 337 X

[56] References Cited

U.S. PATENT DOCUMENTS

| | | | |
|---|---|---|---|
| 2,401,613 | 6/1946 | Charland | 62/438 X |
| 3,553,976 | 1/1971 | Cumine et al. | 62/518 X |
| 3,858,405 | 1/1975 | Manzke | 62/243 X |
| 3,912,475 | 10/1975 | Patrick | 62/244 X |
| 4,103,510 | 8/1978 | Hall | 62/243 X |
| 4,483,151 | 11/1984 | Fujioka et al. | 62/244 X |
| 4,637,220 | 1/1987 | Sakano | 62/244 X |
| 4,653,289 | 3/1987 | Hodgetts | 62/244 X |

*Primary Examiner*—Lloyd L. King
*Attorney, Agent, or Firm*—Fleit, Jacobson, Cohn & Price

[57] ABSTRACT

The invention relates to a refrigeration system for use in motor-cars equipped with an air-conditioning system. The refrigeration system comprises a metal cooling mantle through which a cold refrigerant is circulated, the size of the mantle being such as to closely fit a standard beverage can or bottle. Preferably, the mantle has a gap along one of its sides parallel to the axis, so that when there is circulated a refrigerant through the said mantle, the gap narrows or closes, thus establishing contact between the inner surface of the mantle and the beverage container. The cooling is rapid and takes up only a small part of the cooling capacity of the air-conditioning system.

5 Claims, 2 Drawing Sheets

REFRIGERATION SYSTEM FOR MOTOR CARS

FIELD OF THE INVENTION

There is provided a rapid cooling system for beverages in motor-cars. The system is based on the utilization of part or all of the cooling capacity of an existing motor-car airconditioner. The novel system is in the form of a separate unit for the rapid cooling of one or more units of a drink, such as a can, bottle or the like.

BACKGROUND OF THE INVENTION

There exists a definite need for cold drinks, especially in a hot climate during long journeys in the hot summer months. Many motor-cars are equipped with air-conditioners, and the cooling capacity of these is quite large. The present invention provides rapid cooling means for beverages for use in a motor-car equipped with an air-conditioner.

SUMMARY OF THE INVENTION

There are provided cooling means for drinks in motor-cars, based on the use of the cooling capacity of existing motorcar air-conditioners. The novel system is quite inexpensive and provides means for rapid cooling of one or more cans or bottles of drink, of a given size. The novel rapid cooling system can be operated during periods when the air-conditioner is off (due to thermostat control), or it can use part of the cooling capacity thereby somewhat decreasing the effective cooling of the car usually by not more than about 5 percent, when a standard can of beverage (about 330 milliliter) is cooled, which can be done within about 3 to 5 minutes. Experiments have shown that a can, can be cooled within about 3 minutes from about 30° C. to about 10°-12° C.

Figure 1A:
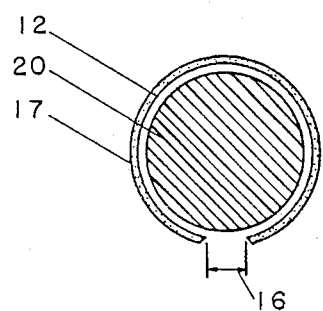
Figure 1B:
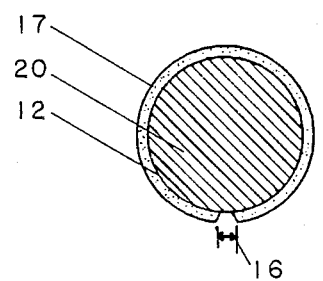
Figure 2:
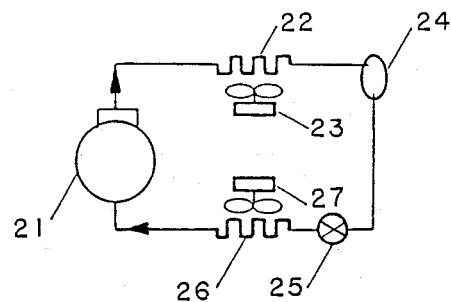
Figure 3:
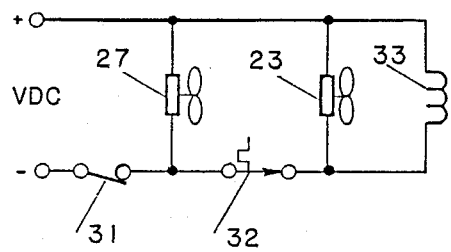
Figure 2A:
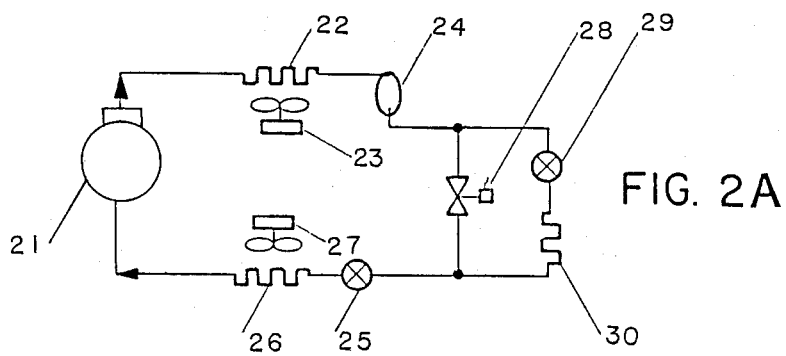
Figure 3A:
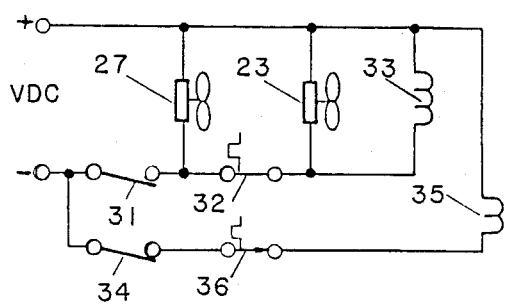

The invention is illustrated with reference to the enclosed schematical drawings, which are not according to scale, and in which:

FIG. 1: is an isometric drawing of the can rapid cooling device of the invention;

FIG. 1A: is a top view of the device of FIG. 1 in open (warm) condition;

FIG. 1B: is a top view of the device of FIG. 1 in closed (cold) condition;

FIG. 2: illustrates the refrigeration system of a conventional motor car-air conditioner;

FIG. 2A: illustrates the refrigeration system of a conventional motor car-air conditioner with a rapid cooling device for beverages;

FIG. 3: illustrates the electrical wiring of a conventional car air-conditioner;

FIG. 3A: illustrates the electrical wiring of a conventional motor car air-conditioner with a rapid cooling device for beverages.

FIGS. 1, 1A and 1B illustrate the rapid cooling device for beverages. As shown in FIG. 1, the device comprises a cooling mantle (11), which is constructed from two concentrical metal cylinders, an inner cylinder (12) and an outer one (13), with a gap along the side of the cylinder, the cylinders terminating at sections 14 and 15, thus forming a gap (16).

The metal cylinders (12) and (13), are welded concentrically to each other at a certain distance providing a space for the cooling medium (17), which enters the mantle through conduit (18), and leaves through conduit (19). The mantle operates as the evaporator in the can-cooling device.

FIG. 1A, illustrates can (20) installed in the interior of the device before the cooling starts. When the cooling system does not operate, the saturated pressure of the cooling medium (17) (Freon-12) is about 6.8 atm gauge, and this pressure causes the gap (16) to widen (Burdon tube principle) and allows to insert the can (20) into the device inner space, as shown.

FIG. 1B, illustrates the can (20) in the interior of the device during the cooling mode. The cooling system operates, and the cooling medium (17) is at a low temperature, of about 18° C., and at a low pressure of about 8 PSIG, which causes the gap (16) to narrow or close (Burdon tube principle), the inner cylinder (12) tightens around the can, and the high heat transfer by contact causes a quick cooling of the beverage in can (20).

It is possible to use mechanical aid, not shown, for widening or narrowing the gap.

Experiments have shown that it is possible to cool a can of beverage within approximately 3 to 4 minutes from 32° C. to about 10° C.

As illustrated by FIG. 2, a conventional air-conditioning system of a motor-car, comprises a compressor (21) actuated via the motor belt of the motorcar, which compresses a liquifiable gas like Freon 12 to a pressure of about 12.2 atm gauge at about 55° C. which enters the condensor (22) while ambient air is circulated via fan (23) over the coils of the condensor (22), which is thus liquified at about 50° C., and which liquid Freon, flows to the liquid accumulator (24), and via thermostatic expansion valve (25), which reduces the pressure of the Freon to about 37 PSIG and to 5° C. to evaporator coil (26), over which there is circulated air from the interior of the car by fan (27), which air is cooled, while the temperature of the Freon increases, which is thus again converted to the gaseous form. The evaporation takes place at about 4.5° C., and the Freon again enters the compressor (21), and the cycle is repeated.

FIG. 2A, illustrates a system for use with a cooling device, based on the motor-car air-conditioner. The parts of the air-conditioning system are designated by the same numbers. The system comprises a solenoid valve (28), which is opened when the motor-car air-conditioner is in operation. When the beverage cooling device is to be operated, this valve is closed and the Freon flows via the expansion means (29), and through evaporator (30) of the refrigerator. This evaporator can be in the form of a mantle as shown in FIGS. 1, 1A and 1B, or in any other shape in which it is possible to tighten the cold evaporator mounted around a can or other product.

FIG. 3, illustrates an electrical circuit of a conventional motor-car airconditioning system. After turning on the air-conditioner switch (31), the evaporator fan (27) is operated. When the thermostat (32) of the airconditioner sets the system to an ON position, the condenser fan (23) is actuated and the clutch of the compressor (33) operates the airconditioning system.

FIG. 3A, illustrates the electric circuit of an air-conditioner and beverage cooling device. The command of the air-conditioner system is according to FIG. 3, when the cooling device is to be actuated, the switch (34) is operated and moved to the ON position, the solenoid valve (35) is actuated and the cooling device is put into action. After the required degree of refrigeration is attained, the cooling thermostat (36) switches to the OFF position. It is possible, with some chance in the wiring, to operate the refrigerator unit simultaneously together with the airconditioning system, or by itself. The thermostat can also be used for the automatic release of the can, and it is also possible to use a timer instead of the thermostat.

I claim:

1. A refrigeration system for the rapid cooling of a beverage container, at least part of which defines a cylindrical surface, for use in conjunction with an existing motor-car air-conditioning system, said refrigeration system comprising:

a cooling mantle for selectable engaging in heat conductive contact substantially the entire cylindrical surface of the container, said cooling mantle comprising fluid entry and exit conduits and defining therebetween a fluid path for a refrigerant fluid associated with the motor car air-conditioning system;

refrigerant fluid expansion means associated with said fluid entry conduit; and selectable valve means associated with the motor car air-conditioning system operable in a first mode to permit flow therethrough of said refrigerant fluid such that it bypasses said refrigeration system, said valve means being further operable in a second mode to prevent flow therethrough of said refrigerant fluid such that it flows through said cooling mantle, thereby causing said mantle to close around the surface of the beverage container so as to cause rapid cooling of the beverage contained thereby.

2. A refrigeration system according to claim 1, and wherein said cooling mantle comprises two interconnected concentric cylindrical shells defining a longitudinal axis and defining a gap along the side of said mantle parallel to the axis, said mantle contracting when said refrigerant fluid is circulated between said entry and exit conduits along said fluid path, so as to engage the in-heat-conductive contact and thereby cool the beverage container.

3. A refrigeration system according to claim 2, wherein mechanical means are provided for augmenting the closing of said mantle around the container.

4. A refrigeration system according to claim 2, and wherein said mantle is operative in said second operative mode to accommodate in tight fit a standard-size beverage can.

5. A system according to claim 1, where means are provided for disconnecting the motor-car air-conditioning system for the duration of the cooling of the beverage.

* * * * *